United States Patent [19]

Weiss et al.

[11] 4,351,688

[45] Sep. 28, 1982

[54] COMPOSITE TAPE LAYING MACHINE

[75] Inventors: Olin E. Weiss, Anneta North; Grant L. Davis, Fort Worth; James L. Hudson, Azle; Harlan T. Dowell, Fort Worth, all of Tex.

[73] Assignee: General Dynamics Corporation, Fort Worth, Tex.

[21] Appl. No.: 265,373

[22] Filed: May 20, 1981

Related U.S. Application Data

[62] Division of Ser. No. 101,524, Dec. 10, 1979, Pat. No. 4,292,108.

[51] Int. Cl.³ .............................................. B32B 31/18
[52] U.S. Cl. .................................. 156/358; 156/361; 156/523
[58] Field of Search ............... 156/361, 363, 353, 523, 156/522, 259, 271, 433, 577, 579, 526, 358, 540; 83/408, 302; 234/38, 46

[56] References Cited

U.S. PATENT DOCUMENTS 3,574,040 4/1971 Chitwood et al. .................. 156/522
3,775,219 11/1973 Karlson et al. ..................... 156/353
3,810,805 5/1974 Goldsworthy et al. ............ 156/361

Primary Examiner—Michael W. Ball
Attorney, Agent, or Firm—Robert A. Felsman; James E. Bradley

[57] ABSTRACT

An apparatus for severing and laying composite tape to form structural members with a shearing and compacting mechanism capable of a large variety of angular or circular severances. The severances are formed incrementally or digitally with a number of lengthwise slits of selected length. A plurality of transverse cuts are formed in the tape to intersect the slits to form a stair-stepped severance. A curved chute at the discharge end of the apparatus has an endless belt to maintain the tape in alignment as it is pressed onto the work surface. The tape is compacted onto the work surface by a segmented roller system composed of several individual rollers. As the severance is reached, the rollers are selectively and individually disengaged from the work surface to correlate compaction termination with the shape of the severance.

2 Claims, 14 Drawing Figures

COMPOSITE TAPE LAYING MACHINE

This is a division of application Ser. No. 101,524, filed Dec. 10, 1979, now U.S. Pat. No. 4,292,108. The Government has rights in this invention pursuant to contract No. F33615-77-c-5018 awarded by the Department of the Air Force.

BACKGROUND OF THE INVENTION

1. Field of the Invention

This invention relates in general to composite tape technology, and especially to machines and methods for laying composite tape to form laminated structural members.

2. Description of the Prior Art

Composite tapes of tectonic unidirectional filaments in a resinous matrix are used to form structural members. Some aircraft have polymerized laminations of such tapes used as portions of the horizontal and vertical stabilizer skins instead of the more conventional metallic skins. The composition of the suitable tapes, the filaments and matrices are well known in the aerospace arts.

Composite tapes may be laid by hand into parallel rows to form one layer and crossing parallel rows to form additional layers. Machines to automate the process have been suggested, one being disclosed in U.S. Pat. No. 3,574,040, "Apparatus For Making Laminated Structural Shapes By The Controlled Detrusive Placement And Polymerization of Tectonic Filamentous Tapes", B. E. Chitwood, et al., Apr. 6, 1971. This machine employs a belt drive to pull composite tape from a spool, a separator to collect the backing from the tape, a tape shear blade, an applicator vacuum belt to carry the tape to the work structure, and a pendant roller foot including heating elements to assure adhesion to the preceding layer by imparting tackiness to the resinous matrix and partial polymerization to the semi-cured stage.

In an alternate embodiment the heating of the tape is accomplished with a detrusion nozzle for directing heated air onto the tape. Gap or overlap of adjacent tapes is avoided by use of a sensor such as a photoelectric cell or air-gauge to detect the edge of a previously laid tape for communication to the control system.

The system includes a frame to support a table, a rotary table to support a pattern or die, a trellis, a tram carriage on a rail beam to support a detrusion pendant containing the above tape laying mechanisms. Control of the tape laying mechanism is achieved by the use of a master indexing template on a rotary table and photoelectric scanning cells, which sense the pattern of the tape from the template and transmit this information to the tape laying mechanism. There have been various modifications to this machine such as the use of numerical control instead of the template.

The prior art methods and mechanisms have the following disadvantages: (1) the tape shear blade cannot cut tape at angles greater than about sixty degrees and cannot make curved or bi-directional cuts; (2) the tape shear blade cannot cut tape while the tape is being fed through the machine; (3) short courses or lengths of tape less than 9¾" cannot be laid; and (4) the pressing roller cannot terminate its pressing along a nonperpendicular cut.

SUMMARY OF THE INVENTION

It is the general object of this invention to overcome the disadvantages enumerated above with respect to the prior art methods and machines.

In accordance with this object the tape is slit lengthwise or longitudinally to form staggered strips of a selected length and predetermined width. After slitting, the resulting strips are sheared or cut transversely by a group of cutters arranged in a digital design for individual activation. This enables a digital approximation of a wide variety of angles across the width of the tape that can include curved surfaces and enables compound or multiple angles.

A transport and tape feed system prevents overlapping and gaps by use of backing paper and tape of a selected and identical width. Immediately below this shear system and preceding the laydown rollers, a belted roller chute holds the tape securely and keeps proper fiber orientation. The tape is released from the roller chute a fraction of an inch in front of the laydown rollers, enabling the use of very short tape length or courses.

The laydown rollers comprise a transverse roll of separate rollers, each roller being individually activated for compaction of tape strips cut at differing points to form an angular cut. The non-compacted end of the tape is pulled up and retracted into the head for subsequent placement at the beginning at the next course or row. A toggle-action linkage is used to control each individual roller, which is controlled by a solenoid and spring return. Roller pressure against the tape is controlled by regulated air pressure to obtain uniformity of pressure against the tape irrespective of the number of rollers in engagement with the tape.

Additional objects, features and advantages will become apparent in the following description.

DESCRIPTION OF THE PREFERRED EMBODIMENT

Figure 1:
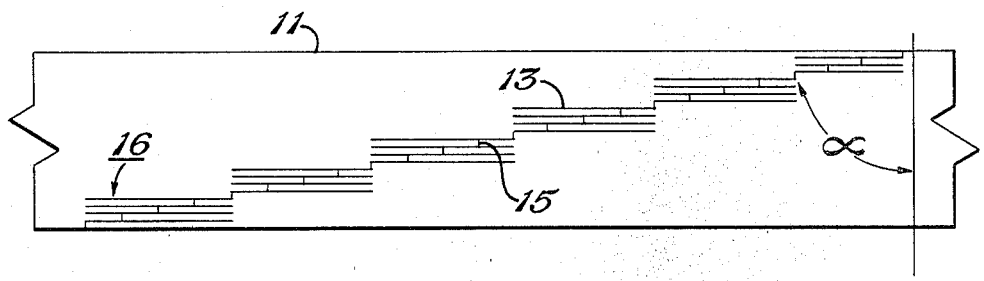
FIG. 1 illustrates a composite tape with portions slit and cut digitally to form a selected angle.

Referring initially to FIG. 1, a tape 11 is illustrated to show a plurality of longitudinal or lengthwise slits 13, across which extend transverse and digital cuts 15. A stair-stepped severance of the tape results approximately along a line intersecting cuts 15 at the angle $\alpha$ with respect to a line perpendicular to the tape 11 length. The slits 13 are grouped in a plurality of sets 16, as will be explained hereinafter.

Figure 2:
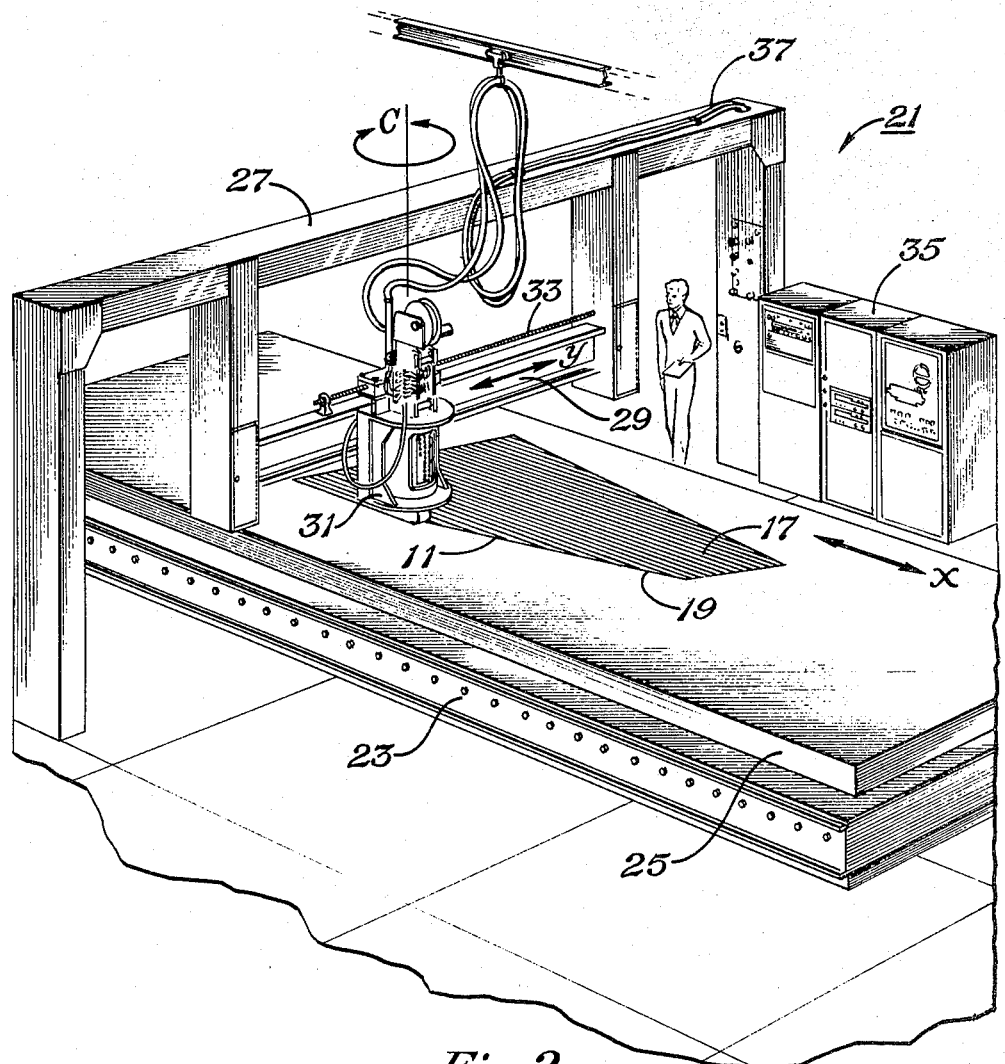
FIG. 2 illustrates the overall machine in a perspective view.

With reference to FIG. 2, there is shown a structural member 17 having a periphery 19 formed by tapes 11 laid in parallel rows with severances at selected angles digitally formed as shown in FIG. 1. The overall machine in FIG. 2 is designated by the numeral 21 and includes a supporting base 23, a work table 25, a gantry support 27, and a gantry 29 that supports a tape laying head 31. The table 25 is moved horizontally along the "X" axis with respect to gantry 29 by a worm screw (not shown) on the base 23. The tape laying head 31 is moved along the gantry 29 along the "Y" axis by the worm screw 33. Vertical moving frame 104 (FIG. 3) is moved up and down in head encasement 32 by application of air pressure to air cylinders not shown. The vertical moving frame 104 may rotate in head encasement 32 to selected points 180° about the "C" axis to enable the laying of parallel rows to form one layer or ply and crossing parallel rows to form additional layers. This is accomplished by coordinated X movements of table 25 and Y movements of head 31.

Movements of the machine are numerically controlled by use of the computer 35. Control lines 37 lead to the tape laying head 31, while other control lines (not shown) control the movements of the table 25.

Figure 3:
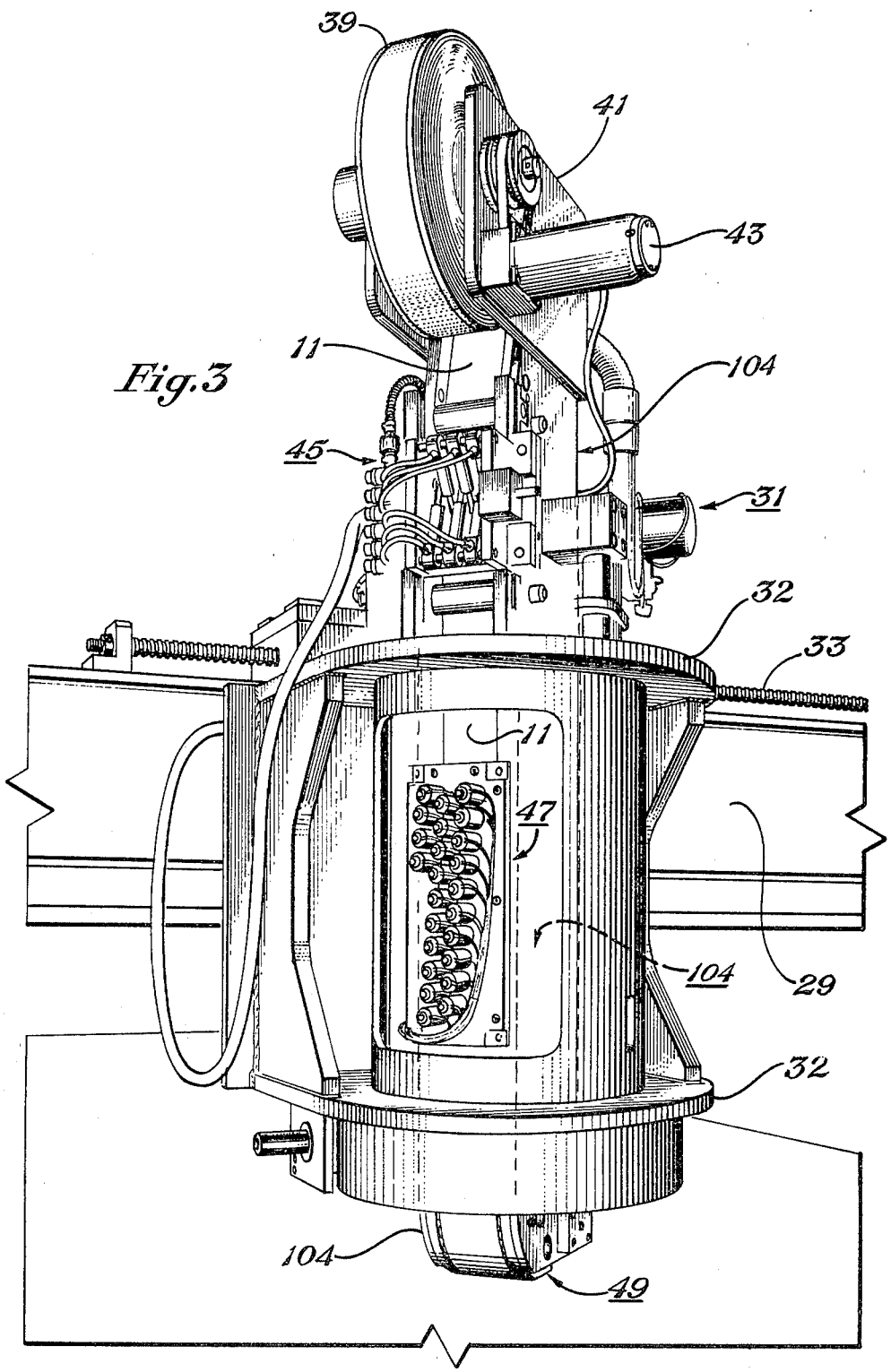
FIG. 3 is a perspective view of the tape laying head.

The tape laying head 31 is shown in greater detail in FIG. 3, being mounted upon the gantry beam 29 by chain bearings (not shown) for transverse movement along the "Y" axis by rotation of the worm screw gear which is powered by an electrical motor (not shown). The transverse movement is precisely controlled by a conventional gear rack and gear box and monitored by an encoder (not shown) mounted on the other side of gantry 29.

A roll 39 of composite tape with backing paper is mounted at the upper support member 41 for feeding tape 11 through the feed system. Electrical motor 43 is used to retract the tail of tape 11 after a section has been laid. Electrical motor 43 also provides some drag on supply roll 39 as tape 11 is drawn off. The tape, as it is unrolled, first moves past a slitter mechanism 45, the details of which will be described subsequently in connection with FIGS. 4 and 5. The purpose of slitter mechanism 45 is to form the lengthwise or longitudinal slits 13 as seen in FIG. 1 for the purpose of dividing the tape into strips of a predetermined width, length, and spacing.

Next, the tape 11 moves downward to the region of the tape shearing or tape cutting mechanism 47, which forms digital cuts 15 in the tape, as shown schematically in FIG. 1. Hence, a selected cut such as one approximating an angle $\alpha$ shown in FIG. 1 may be formed. The details of the tape cutting mechanism will be described subsequently in connection with FIGS. 5 and 6.

Subsequent to the shearing or digital cutting of the tape 11, it is moved across a belted roller chute assembly 49, the details of which will be described subsequently in connection with FIGS. 7 and 8. The purpose of the roller chute 49 is to retain the tape securely to eliminate gaps, overlaps and misalignments between adjacent rows of tapes and to maintain the selected fiber orientation.

Although not apparent in FIG. 3, the next step in the method utilized by the machine involves the compaction of the tapes by a laydown roller mechanism 48, as illustrated in FIGS. 9–14, which serves as press means for pressing tape 11 into adhering contact with the work surface. Tape 11 is released from the roller chute 49 a fraction of an inch in front of the laydown roller mechanism 48, which enables the use of very short tape lengths or courses. The laydown roller mechanism 48 is divided into multiple rollers or segments for individual activation and compaction of selected sets of strips of the slitted tape 11, as will be described more completely in connection with FIGS. 9–14.

From the above overall description of the machine, it will be seen that the method utilized by the machine involves the steps of slitting the tape along selected portions of its length to form strips of predetermined width and length, cutting the strips individually to digitally form an angle or curve, conveying the slitted and cut tape toward the structural member being formed, and compacting the strips selectively onto the work surface or tape previously laid. Additional and more detailed method steps will become apparent hereinafter.

Figure 4:
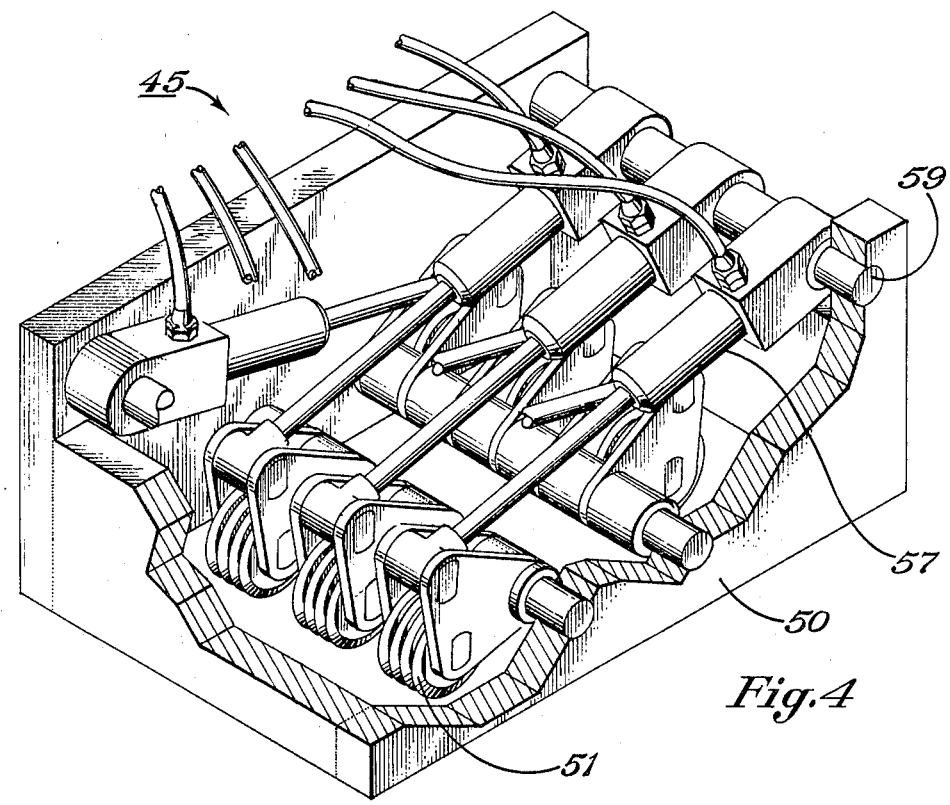
FIG. 4 is a perspective view of the preferred slitter mechanism.

The tape slitter mechanism 45 is shown in greater detail in FIG. 4. The purpose of this mechanism is to assure slits 13 (FIG. 1) that run parallel to the tape fibers. The preferred slitter mechanism 45 is shown in FIG. 4 and is contained in a support structure 50. There are preferably twenty-three one inch diameter slitting disks or wheels 51 mounted in six sets (not all shown). Five of the sets have four slitting wheels 51 and one set has three wheels. To assure a positive slitting action, the circular slitters move at a surface speed equal to the speed of tape laid on the work surface of work table 25. Activation of the pneumatic cylinders 57 on support shafts 59, causes engagement of the slitter wheels 51 with the tape 11. The pneumatic cylinder is preferably a single-acting air cylinder with air flow by a valve activated by electric solenoid (not shown) in response to computer control. Subsequent to completing the slitting operation, air pressure is closed off by the solenoid to enable retraction of the slitters with springs (not shown).

As shown in FIG. 4, the sets of cutters are mounted in two banks, each bank slitting against a plate (not shown) behind the tape 11 in the tape laying head 31 of FIG. 3. The composite tape and backing paper pass between the backup plate and slitting wheels 51. When slitting is required, the appropriate set of wheels are pushed against the backup plate at a pressure selected to cut only the composite tape 11 and not its backing paper. Each set of slitting wheels 51 is independently actuatable.

Figure 5:
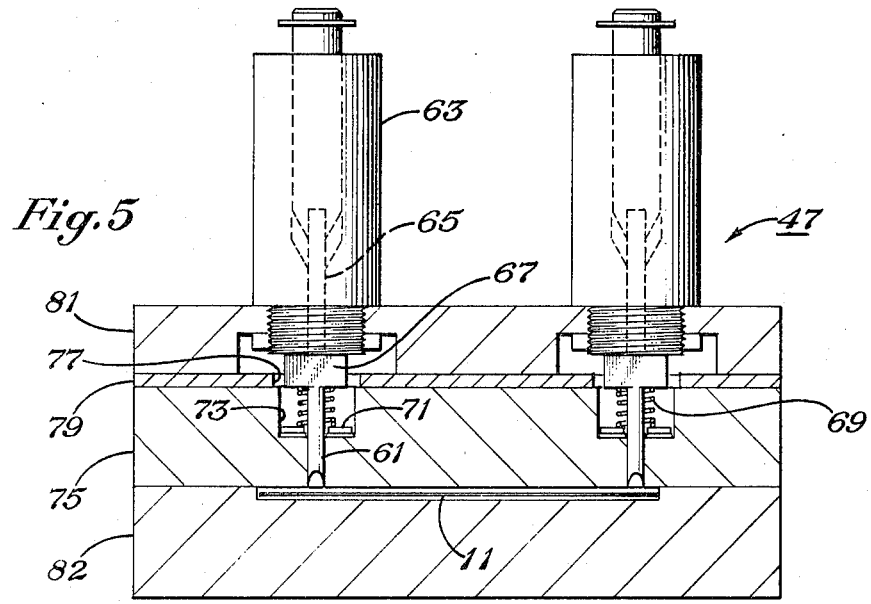
FIG. 5 is a schematic view of the digital cutter mechanism.
Figure 6:
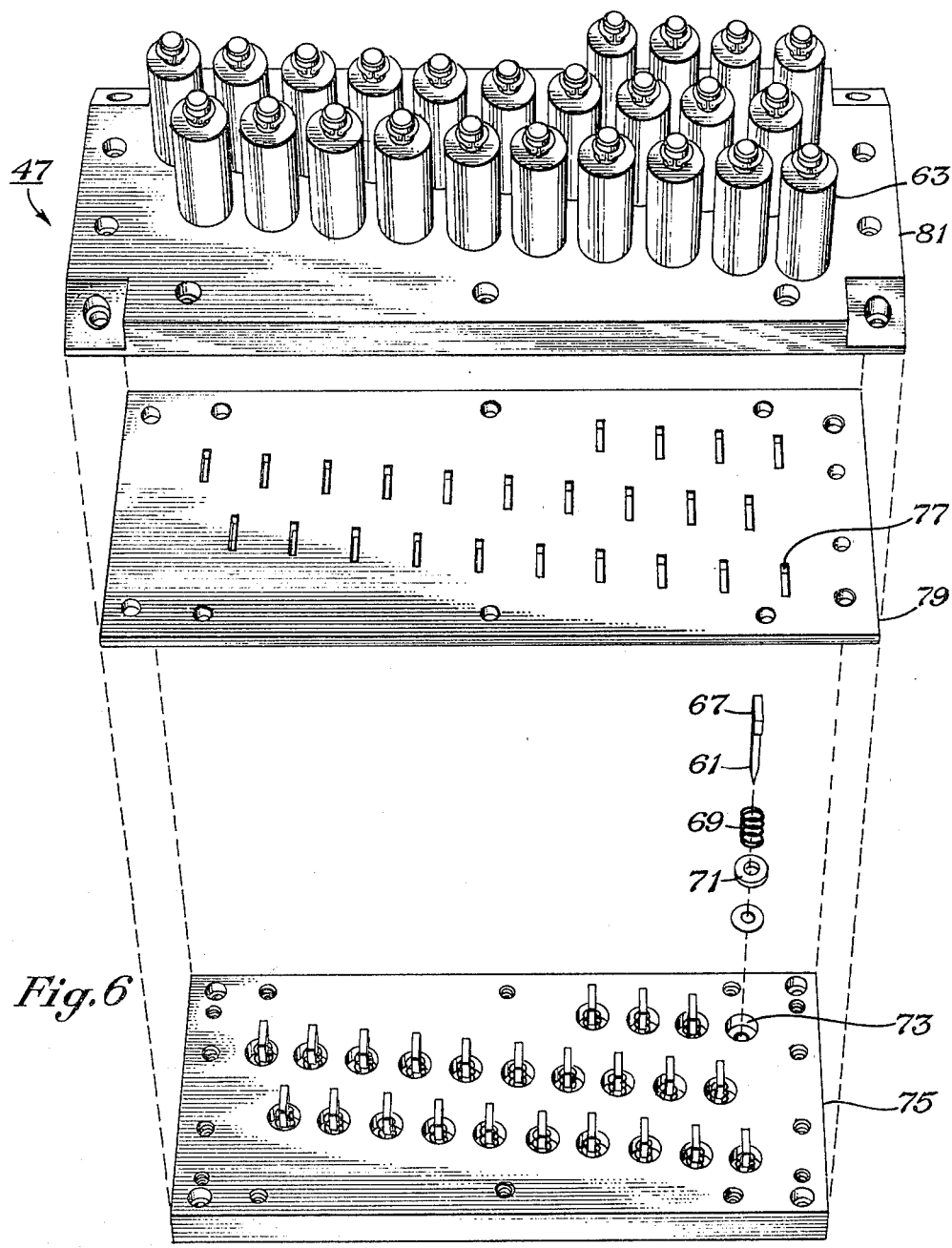
FIG. 6 is a perspective view, exploded to show various components of the digital cutter mechanism.

Next, the tape 11 is drawn across the digital cutting or shearing mechanism 47, the word "digital" meaning that a complete cut across the width of the tape is made by several incremental cuts 15 (FIG. 1) with small blades of the type illustrated in FIG. 5 and 6. In the preferred embodiment there are twenty-four 0.156 inch wide chisel type cutters 61 which constitute the shear system or mechanism. Each cutter 61 is powered by its own solenoid 63, with the cutters 61 and solenoids 63 being grouped in an array as indicated in FIG. 6. Each cutter 16 is aligned to cut between two adjacent slits 13

(FIG. 1) and is of a width that is substantially the distance between two adjacent slitter wheels 51 (FIG. 4), with only slight overlapping. As shown in FIGS. 3 and 6, the cutters 61 are not mounted in a single transverse row, rather they are vertically staggered from each other. Also, each cutter 61 cuts a selected perpendicular segment of tape 11 without overlapping with any other cutters 61.

The cutters 61 are not fastened directly to the solenoid plunger 65 shown in FIG. 5, but rather the solenoid plunger 65 strikes the top 67 of the chisel cutter 61, which is thus driven into the composite tape 11. The cutter 61 and solenoid plunger 65 are returned to a rest position by a spring 69 placed around the cutter 61 and against shims 71 received in a drilled hole 73 of a retention plate 75. The depth of cut may be adjusted by proper selection of the number and size of shims 71, which constitutes one type of adjustment means. Preferably only tape 11 is cut and not its backing paper.

The top 67 of each cutter 61 is received by an aperture 77 in a guide plate 79. A top plate 81 is then assembled with the guide plate 79 and retention plate 75 by suitable fasteners. Tape 11 is maintained by a vacuum against an anvil 82 (FIG. 5) as it is drawn past cutters 61. Testing indicates that this cutter arrangement or mechanism is capable of cutting composite tapes while the tapes are in motion or "on-the-fly". While the precise speed limitations have not been determined, there is indication that the cutting can be accomplished satisfactorily with the tape moving at speeds of 180 inches per minute. The chisel shaped cutters perform best when the cutting extremity of 61 is formed of carbide brazed to the remainder of cutter 61.

Figure 7:
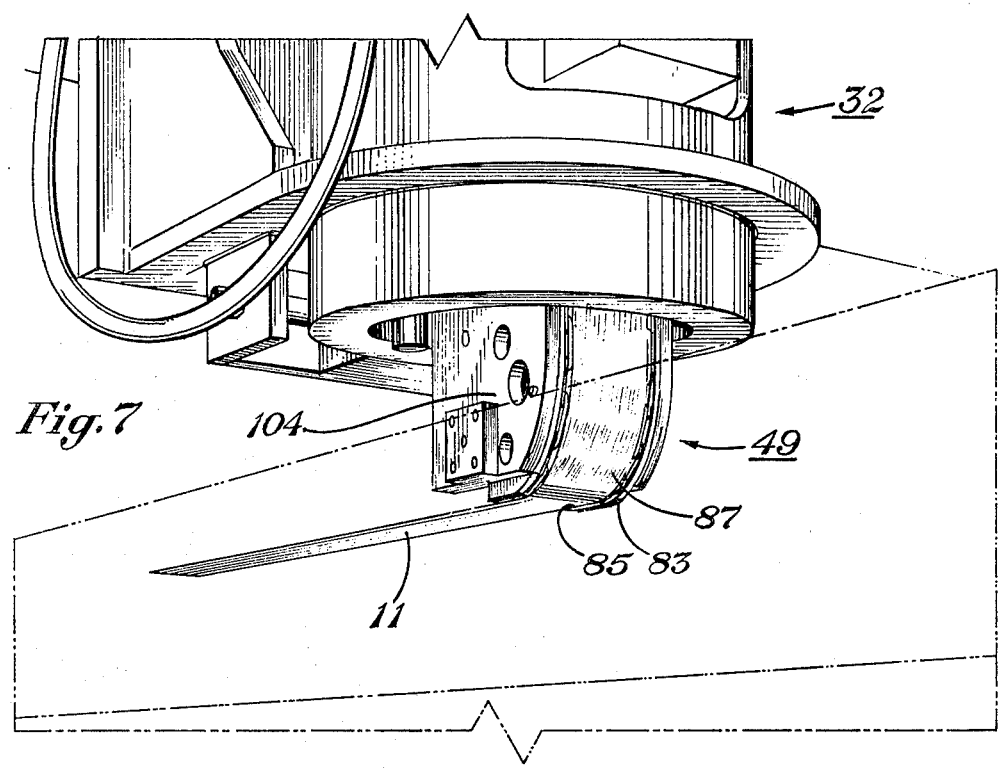
FIG. 7 is a fragmentary perspective view of the belted roller chute assembly or mechanism.
Figure 8:
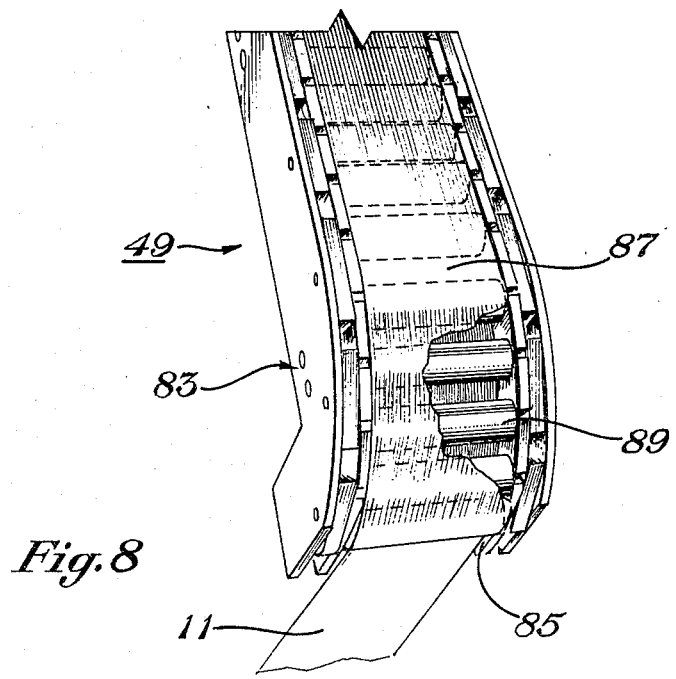
FIG. 8 is another view of a portion of the belted roller assembly.

The tape 11 after leaving the digital cutter mechanism passes through a belted roller chute assembly 49, shown in FIGS. 7 and 8. The belted roller chute 49 includes a 90° curved metal chute 83 having a channel 85 for changing the direction of tape 11 travel from vertical to horizontal. An endless flexible belt 87 of Teflon (see FIG. 8) is mounted in a curved contour within the channel 85 of chute 83. Rollers 89 are rotatably carried in the sides of the channel 85 to support belt 87. Belt 87 is not driven, rather moves due to friction as tape 11 is pulled out. Belt 87 and chute 83 serve as guides to keep the tape 11 strips and fibers properly aligned during laydown.

Figure 9:
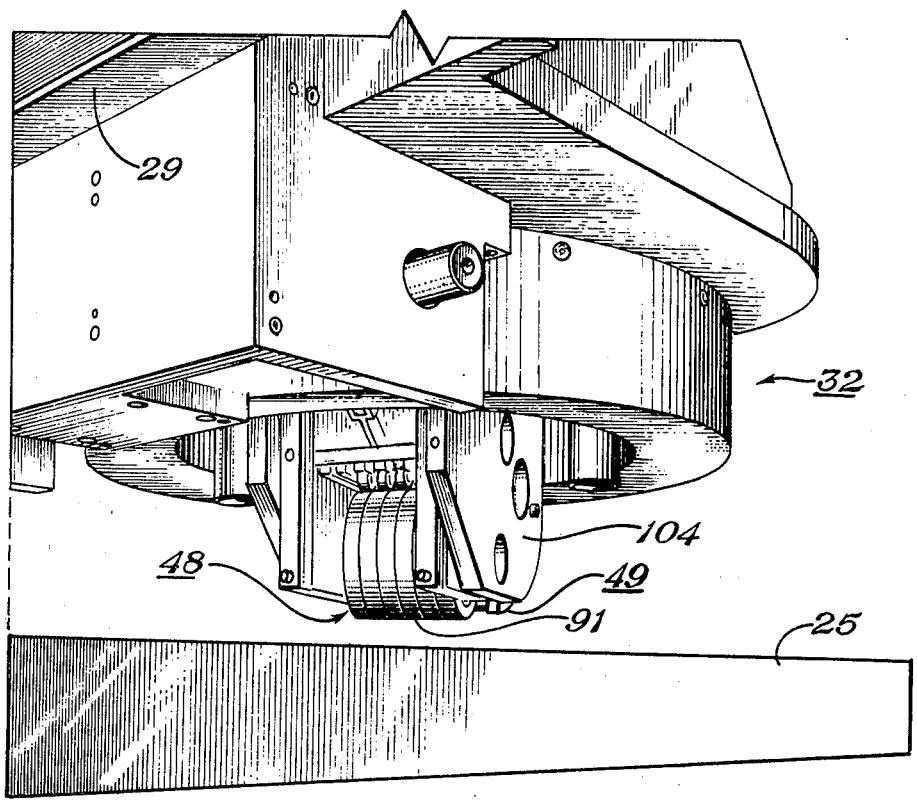
FIG. 9 is a fragmentary perspective view of the segmented roller system.

The segmented roller system 48 is shown in FIGS. 9-14 and contains segmented or individual rollers 91 which roll by the friction created by the force of the head on the composite tape on the work surface. The segmented rollers 91, as shown in FIG. 9, consist of a plurality of individual rollers, preferably six, mounted in a row perpendicular to the length of tape 11. Each roller 91 has a width of about ½ inch and corresponds to a set 16 of slits 13 (FIG. 1). This segmented design allows for selective roller compaction of composite tape courses which terminate in a nonperpendicular course or severance 93, shown in FIG. 10. Progressively fewer of the rollers 91 engage and compact the tape 11, as is illustrated schematically by the rows a, b, and c of rollers 91 shown in FIG. 10. Each roller 91 ceases engagement once it contacts severance 93. This better enables the non-compacted tail 95 to be pulled upward and retracted into the head 31 for subsequent placement at the beginning of the next course, a feature which limits the amount of waste tape from the operation. Also, the total weight on the roller system 48 is proportionally reduced each time a roller 91 is disengaged, so that each roller 91 always exerts the same force.

Figure 12:
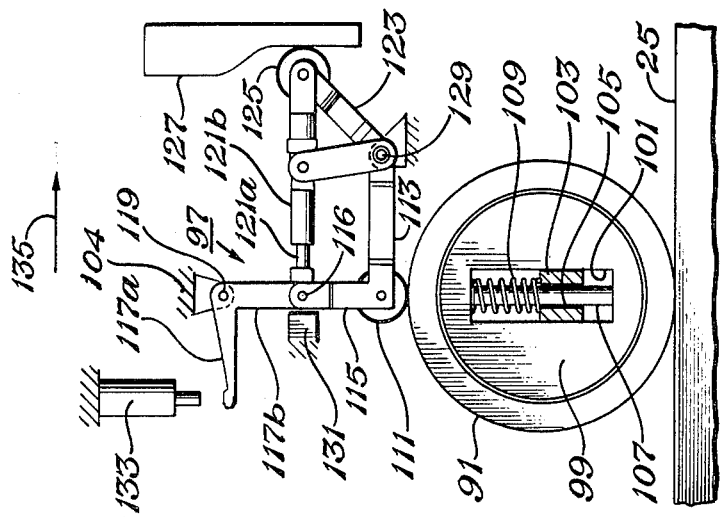
FIG. 12 is a schematic side elevational view of the segmented laydown roller system, with a roller shown in pressing engagement.

The toggle action linkage 97 for selectively disengaging and engaging rollers 91 is illustrated in FIGS. 11-14. Referring to FIG. 12, each roller 91 is rotatably mounted by ball bearings on a bearing carrier 99. Bearing carrier 99 does not rotate and has a vertical slot 101 in its center. A single axle 103 for all of the rollers 91 is secured into the vertically movable frame 104 within head encasement 32 so that the axle always remains horizontal. Axle 103 has a vertical hole 105 for each roller 91. The vertical rod 107 for each bearing carrier 99 extends slidingly through each hole 105. A coil spring 109 encircles each rod 107 between the top of slot 101 and axle 103. Spring 109 is compressed so that it tends to urge the roller 91 upward with respect to axle 103.

In the pressing engagement position, as shown in FIG. 12, a linkage roller 111 prevents spring 109 from disengaging roller 91 from the work surface of work table 25. Roller 111 is rotatably secured to two linkage members 113 and 115 extending approximately at right angles from each other. The top of linkage member 115 is pivotally secured by a floating pin 116 to a finger member that has two portions 117a and 117b extending at about a right angle with respect to each other. Finger member 117 is pivotally secured by fixed pin 119 to the vertically movable frame 104 of head 31.

A telescoping member 121 is secured to the intersection of linkage member 115 and finger 117. Telescoping member 121 has two portions, 121a and 121b, that slide within each other to vary its length. The other end of telescoping member 121 is secured to a three piece substantially rigid frame 123. A roller or cam follower 125 is rotatably carried by frame 123 for engaging a cam surface 127. Cam surface 127 has a ramp leading to an upper end that is closer to pin 119 than the lower portion. Cam surface 127 is carried by head encasement 32, however, is not vertically movable with the frame 104. The lower end of frame 123 is secured by a fixed pin 129 to frame 104. The opposite end of linkage member 113 is also secured to pin 129. Each roller 91 has a separate solenoid 133, and separate linkage members 113, 115, 117 and 121. A single cam surface 127, frame 123 and cam follower 125 serve for all six rollers.

A fixed stop bar 131 is secured to frame 104 of head encasement 32 and is located forward of floating pin 116. It is positioned so that when the joint of pin 116 contacts stop 131, linkage member 115 is slightly over-center with finger member 117b. Floating pin 116 will be closer to the vertical plane of stop 131 than fixed pin 119. An electrical solenoid 133 is mounted above finger portion 117a for disengaging rollers 91.

During compaction, air pressure is released to allow vertically moving frame 104 weight to be applied as a force that transmits through the finger portion 117b, linkage member 115, and roller 111 to roller 91. Spring 109 acts against this force.

Figure 13:
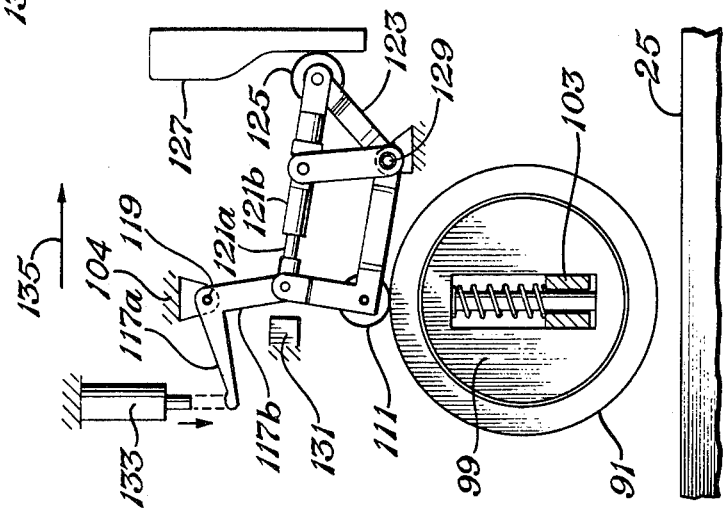
FIG. 13 is a schematic side elevational view of the segmented laydown roller system as shown in FIG. 12, but with the roller shown out of pressing engagement.

In the operation of the roller system 48, arrow 135 in FIGS. 12 and 13 indicates direction of travel of head 31. When it is desired to disengage a wheel 91, a solenoid 133 is actuated by a computer 35 to momentarily press finger 117a. This causes pin 116 to move forward with respect to arrow 135. The telescoping linkage member 121 shortens, with the portion 121a sliding into portion 121b. As shown in FIG. 13, this allows roller 111 to move upward, with coil spring 109 causing the upward movement.

Figure 14:
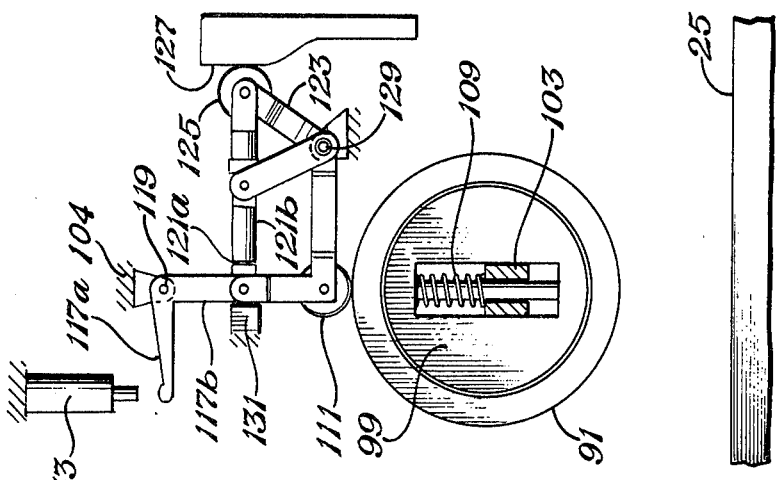
FIG. 14 is a schematic side elevational view of the segmented laydown roller system as shown in FIG. 12, but with the head raised to actuate the linkage back into an engaged position.

Once a section or course of tape 11 is laid, the roller mechanism 48 and roller chute 49, along with frame 104 (FIG. 12), are moved vertically upward within head encasement 32 so that head 31 can move to the next initiating position. When the vertically moving frame 104 within head encasement 32 is raised upward, the rollers 91 and entire linkage system 97, except for cam surface 127, will move upward, as shown in FIG. 14. Cam follower 125 rides up the cam surface 127 and moves floating pin 116 toward stop 131 as it reaches the thicker part of cam surface 127. As pin 116 moves toward stop 131, it passes dead center wherein pin 116 is vertically aligned with fixed pin 119. When the rollers 91 are again lowered, there is no force present to move pin 116 forward again. Consequently, the system is "cocked", and when lowered from the position shown in FIG. 14, it will again appear as shown in FIG. 12. The downward force on frame 104 will be exerted from pin 119 thru the linkage member 115 and finger portion 117b, with stop 131 preventing further rearward travel of the telescoping member 121.

Figure 10:
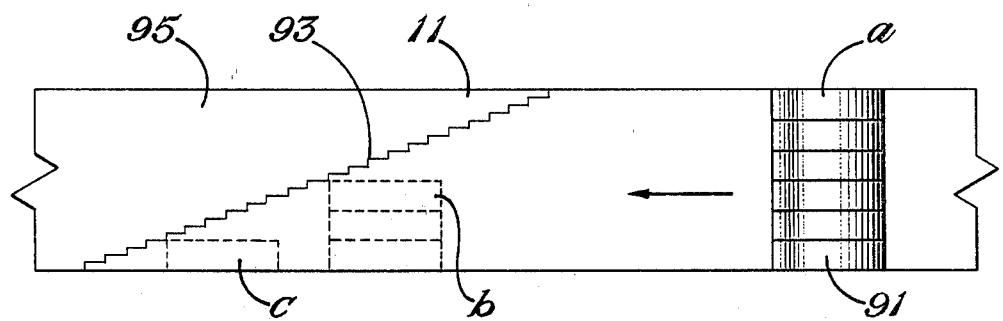
FIG. 10 is a diagram which illustrates the operation of the segmented laydown roller system.
Figure 11:
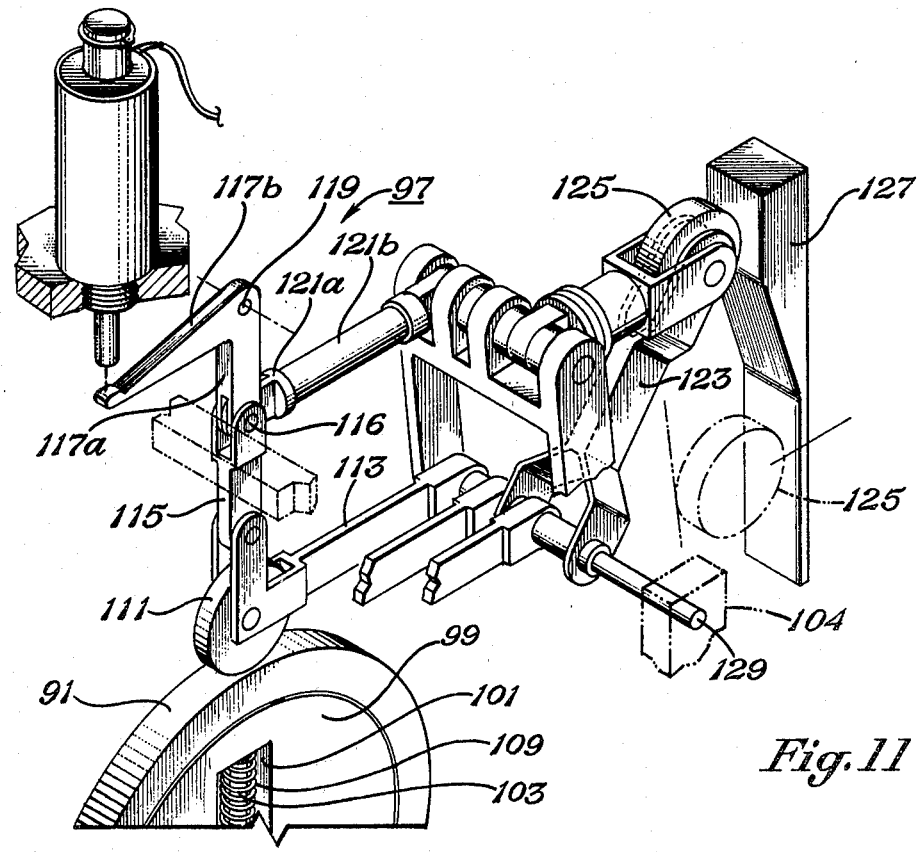
FIG. 11 is a perspective view of the principal portions of segmented laydown roller system.

As a roller 91 is raised at the severance 93, FIG. 10, air pressure is applied on the vertical frame 104 portion to lessen the vertical frame 104 weight by the ratio of the number being raised over the number left plus the number being raised. At position C in FIG. 10, the vertically moving frame 104 weight is 1/6 of that at position a, and ⅓ of that at position b. This allows each roller 91 to maintain the same downward force on the work surface, regardless of the number of rollers 91 in engagement.

In the overall operation of the tape laying system, as shown in FIG. 3, tape 11 is first threaded from the supply roll 39 down the slitter mechanism 45, transverse cutter mechanism 47, the chute assembly 49 and under the laydown roller assembly 48. Then the chute assembly 49 is lowered until rollers 91 compact the first end of tape 11 onto the work surface, this position being shown in FIG. 12. The first end of tape 11 could be a square or perpendicular cut, or it might be an angular cut, depending upon what was previously cut. The first end will adhere to the work surface, which may be a thin flat sheet of plastic on work table 25, or a previously laid layer or ply of tape 11 on structure member 17. Then, referring to FIG. 2, table 25 will be moved along the "X" axis and rollers 91 (FIG. 12) to compact the tape 11 after release from chute assembly 49. Table 25 and its drive system serve as drive means for providing relative movement between head 31 and tape 25 to lay tape 11.

FIG. 2 only shows tape 11 being compacted in "X" axis direction only, it can also be compacted in a vector axis movement by rotating vertical frame 104 in "C" axis movement to proper angle and moving table 25 "X" axis and head 31 "Y" axis in coordinated movements.

As the table 25 moves, the friction of tape 11 adhering to the work surface will cause the tape to move downward from the tape supply 39 and out the chute assembly 49. As shown in FIGS. 7 and 8, belt 87 and chute 83 guide the tape as it turns. Rollers 91 will compact the tape 11 to the work surface, as indicated in FIG. 12. A separate takeup roller (not shown) continuously peels the paper backing from the tape 11 after compaction and winds it up.

As the tape passes through the slitter mechanism 45 and cutter mechanism 47, the computer 35 will instruct these mechanisms on the particular cut. The computer will instruct the slitter mechanism 45 and cutter mechanism 47 when to commence the severance 19 and at what angle. The pneumatic cylinder 57, FIG. 4, and associated control circuitry, serve as slitter wheel actuating means for selectively moving the slitting wheels 51 into and out of engagement with tape 11. Referring to FIG. 5, the solenoids 63 and associated control circuitries serve as cutter actuating means for selectively moving the cutters 61 into and out of engagement with tape 11.

Referring to FIG. 1, in order to determine the precise points at where the slits 13 and cuts 15 will be made, in the preferred embodiment, 23 separate slits are placed by slitters 51 and 24 separate cuts are placed by cutters 61, all while the tape moves. Slitter wheels 51 are mounted so that slits 13 are all of the same parallel distance apart from each other. There are six groupings or sets 16, of which five of the sets 16 have four slits 13 and one has three slits, the one with three slits being shown in the drawing or the uppermost set. The slitter actuating means is controlled so that all of the slits within a single set 16 will start and stop at the same point on tape 11. The sets 16 that have four slits 13 are of the same length, but longer than the set that has only three slits 13. Preferably, the slits 13 within a set 16 do not overlap lengthwise with slits in other sets, providing the stairstep pattern shown in FIG. 1.

All of the cuts 15 are of the same length, which is slightly greater than the distance between two adjacent slits. Also, all of the cuts 15 are perpendicular to the length of the tape. The cutters 61 are mounted so that cuts 15 do not overlap with each other.

When cutting a straight nonperpendicular angle, as shown in FIG. 1, all of the cuts 15 will be uniformly spaced in a stairstep pattern. That is, each cut 15 will be forward of and closer to one side of tape 11 than the cuts immediately before and behind it. The lengthwise distance between the cuts 15 will all be the same. Each set 16 of slits 13 commences on a cut 15 and terminate on a cut 15, these cuts 15 at the commencement and termination linking the set 16 to adjacent sets 16. The sets 16 that contain four slits 13 thus are of length equal to the lengthwise distance between four cuts 15. The three slit set has slits 13 that are of length equal to the lengthwise distance between three cuts 15.

The longitudinal or lengthwise distance between any two cuts 15 depends on the angle. At very high angles $\alpha$, the severance line will be much longer than at low angles $\alpha$. At an angle $\alpha$ of zero degrees, cuts 15 will be sequentially made as the tape 11 moves to create a perpendicular line, and slits 13 will be completely unnecessary.

Once the computer has determined the proper sequence, it signals each set of slitter wheels 51 independently into engagement with the tape 11 at the proper time sequence considering the tape speed (FIG. 4). As these slits (FIG. 1) reach the cutter mechanism 47, referring to FIG. 5, solenoids 63 are actuated at the proper time considering the tape speed, to strike cutters 61. Cutters 61 then place transverse cuts 15 into the tape 11, the cuts 15 intersecting with the slits 13 to define a severance. Although the entire severance is completed at this point, the tape 11 will not separate until it is compacted because of the paper backing on tape 11. There may be several complete segments in the feed path of head 31 for very short courses.

When the end of a course of tape 11 is reached, computer 35 will instruct each solenoid 133 when to disengage its roller 91, as indicated in FIG. 12. Referring also to FIG. 10, a roller 91 will be disengaged once part of it contacts the severance 93. As illustrated by the numeral "a", all six rollers will be in engagement prior to severance 93. At point b, only three rollers 91 are in engagement. At point c, only one roller 91 is in engagement. Referring to FIG. 13, solenoid 133 strikes finger 117a, causing telescoping member 121 to retract and allowing spring 109 to urge roller 91 upward. The air pressure on movable frame 104 is proportionately increased as a roller 91 is raised, the air pressure system and movable frame 104 serving as force regulating means. The linkage system 97 and spring biased arrangement of axle 103, along with associated control circuitry, serve as roller actuating means for moving the rollers 91 into and out of engagement with the work surface.

Once all of the rollers 91 are disengaged, the course has been completed and the roller assembly 48 will be raised by vertical frame 104 as shown in FIG. 14. Cam surface 127 "cocks" the linkage assembly 97 to push rollers 91 back downward with respect to axle 103. Electrical motor 43, FIG. 3, is actuated to draw the tail 95 (FIG. 10) of the supply roll 139 back until the tip of the tail is directly below rollers 91.

The vertical frame 104 is rotated 180° in head encasement 32, head 31 is moved to next initiating position and the cycle is repeated by table 25 "X" axis and head 31 on "Y" axis in opposite directions.

It should be apparent that an invention having significant advantages has been provided. The slitter and cutter mechanism enables severances to be made while the tape is in motion. The severances may be curved, bi-angular or at very high angles. The belted roller chute allows very short courses to be made by preventing them from separating from their paper backing and by maintaining alignment. The segmented roller system provides compaction that approximates the angle of severance.

While the invention has been shown in only one of its forms, it should be apparent to those skilled in the art that it is not so limited but is susceptible to various changes and modifications thereof.

We claim:

1. In an apparatus for laying composite tape in parallel rows to form a structural member, the apparatus being of the type having a table, a tape laying head supported adjacent the table, drive means for providing relative movement between the head and the table, and a tape supply carried by the head, having a free end adapted to pass in a feed path in the head and out onto a work surface on the table, the improvement comprising:

a chute mounted to the head at the discharge end of the feed path for guiding the tape, the chute being curved to change the direction of travel of the tape; and an endless belt mounted adjacent the chute in a curved configuration around the curved portion of the chute, the tape adapted to be carried between the chute and the belt.

2. In an apparatus for laying composite tape in parallel rows to form a structural member, the apparatus having a table, a tape laying head supported adjacent the table, drive means for providing relative movement between the head and the table, a tape supply carried by the head with a free end adapted to pass through a feed path in the head and out a discharge end onto a work surface on the table, and transverse cutter means for making a severance in the tape, the improvement comprising:

a plurality of rollers carried by the head at the discharge end in a transverse row for pressing the tape onto the work surface; and roller actuating means for moving the rollers into and from pressing engagement during said relative movement and for retracting the rollers individually from pressing engagement once a roller approaches the severance.

* * * * *